United States Patent
Huth et al.

(10) Patent No.: US 9,048,714 B2
(45) Date of Patent: Jun. 2, 2015

(54) SQUIRREL CAGE ROTOR HAVING REDUCED RADIUS TO ACCOMMODATE PERMANENT MAGNETS

(75) Inventors: Gerhard Huth, Hohenroth-Leutershausen (DE); Sven Urschel, Eisenberg (DE); Ralf Fischer, Heusweiler (DE)

(73) Assignee: KSB Aktiengesellschaft, Frankenthal (DE)

(*) Notice: Subject to any disclaimer, the term of this patent is extended or adjusted under 35 U.S.C. 154(b) by 0 days.

(21) Appl. No.: 13/529,728

(22) Filed: Jun. 21, 2012

(65) Prior Publication Data

US 2012/0282122 A1 Nov. 8, 2012

Related U.S. Application Data

(63) Continuation of application No. PCT/EP2010/070350, filed on Dec. 21, 2010.

(30) Foreign Application Priority Data

Dec. 22, 2009 (DE) .......................... 10 2009 060 438

(51) Int. Cl.
*H02K 21/04* (2006.01)
*H02K 15/03* (2006.01)
(Continued)

(52) U.S. Cl.
CPC ................ *H02K 15/03* (2013.01); *H02K 1/278* (2013.01); *H02K 17/165* (2013.01); *H02K 21/46* (2013.01)

(58) Field of Classification Search
CPC ....... H02K 1/27; H02K 1/272; H02K 1/2726; H02K 1/278; H02K 1/223; H02K 21/042; H02K 21/46

USPC ............... 310/211, 210, 212, 156.78, 156.79, 310/156.81, 156.83
See application file for complete search history.

(56) References Cited

U.S. PATENT DOCUMENTS

| 4,454,438 A | 6/1984 | Yamashita et al. |
| 5,397,951 A * | 3/1995 | Uchida et al. ............ 310/156.21 |

(Continued)

FOREIGN PATENT DOCUMENTS

| DE | 1 296 701 | 6/1969 |
| DE | 36 09 750 A1 | 9/1987 |

(Continued)

OTHER PUBLICATIONS

Machine translation of JP 2005269707 A (Sep. 2005).*

(Continued)

*Primary Examiner* — Michael Andrews
(74) *Attorney, Agent, or Firm* — Crowell & Moring LLP

(57) ABSTRACT

A rotor (11) with a squirrel cage and permanent magnets (19) mounted on and distributed around the circumference of the rotor, including a core stack extending over the entire rotor region with longitudinally continuous rotor slots extending over the length of the core stack. The squirrel cage is constructed with cage bars disposed, and preferably cast, in the rotor slots; short circuit rings connect the cage bars at both end faces of the core; and the radius of the rotor region is reduced by at least the radial thickness of the magnets. The radius of rotor (11) is reduced over the entire length between short circuit rings (17) such that the radial height of cage bars (15, 29) or cage webs (27) connected thereto is reduced. Also an electric motor or a radial pump having such a rotor, and methods of producing or operating such devices.

17 Claims, 8 Drawing Sheets

(51) Int. Cl.
*H02K 17/16* (2006.01)
*H02K 21/46* (2006.01)
*H02K 1/27* (2006.01)

(56) References Cited

U.S. PATENT DOCUMENTS

| | | | |
|---|---|---|---|
| 5,548,172 A * | 8/1996 | Kliman et al. | 310/211 |
| 5,758,709 A | 6/1998 | Boyd, Jr. | |
| 8,227,951 B2 * | 7/2012 | Grossmann et al. | 310/156.83 |
| 2006/0147326 A1 * | 7/2006 | Kakiuchi et al. | 417/415 |
| 2007/0040466 A1 * | 2/2007 | Vollmer | 310/156.81 |

FOREIGN PATENT DOCUMENTS

| | | | | |
|---|---|---|---|---|
| DE | 3609750 A1 | * | 9/1987 | H02K 21/46 |
| EP | 0 678 967 A1 | | 10/1995 | |
| JP | 2005-269707 A | | 9/2005 | |
| JP | 2005269707 A | * | 9/2005 | H02K 1/22 |
| WO | WO 2005/027308 A1 | | 3/2005 | |
| WO | WO 2005/071818 A1 | | 8/2005 | |

OTHER PUBLICATIONS

Machine translation of DE3609750A1 (Sep. 1987).*
Corresponding International Search Report with English Translation dated Aug. 3, 2011 (seven (7) pages).
Form PCT/ISA/237 (nine (9) pages).
German Examination Report dated Sep. 9, 2010 (seven (7) pages).
English language translation of PCT/ISA/237 Form (Thirteen (13) pages).

* cited by examiner

PRIOR ART

US 9,048,714 B2

SQUIRREL CAGE ROTOR HAVING REDUCED RADIUS TO ACCOMMODATE PERMANENT MAGNETS

CROSS REFERENCE TO RELATED APPLICATIONS

This application is a continuation of international patent application no. PCT/EP2010/070350, filed Dec. 21, 2010 designating the United States of America and published in German on Jun. 30, 2011 as WO 2011/076777, the entire disclosure of which is incorporated herein by reference. Priority is claimed based on Federal Republic of Germany patent application no. DE 10 2009 060 438, filed Dec. 22, 2009, the entire disclosure of which is likewise incorporated herein by reference.

BACKGROUND OF THE INVENTION

The present invention relates to a rotor having a squirrel cage and permanent magnets distributed around the circumference, with the rotor having a laminated core which extends over the entire rotor region and has longitudinally continuous rotor slots, with the squirrel cage passing through the rotor slots over the entire length of the laminated core, with the squirrel cage being formed with cage bars which are situated, preferably encapsulated, in the rotor slots and short-circuiting rings which connect the cage bars on both end faces of the laminated core, with the radius of a rotor region being reduced by at least the radial thickness of the permanent magnets. The invention also relates to an electric motor having a rotor of this kind and to a centrifugal pump which is equipped with an electric motor of this kind. The invention also relates to a method for operating an electric motor which is equipped with a rotor of this kind and to a method for producing a rotor of this kind and/or an electric motor of this kind.

German patent application no. DE 3609 750 A1 discloses an electrical machine which is in the form of a combined synchronous/asynchronous machine and has a stator and has a rotor which is arranged in a rotatable manner in the stator. The rotor is divided into three rotor regions as seen in the axial direction, at least one of said rotor regions being fitted with permanent magnets in the manner of a synchronous rotor and at least one being provided with a squirrel cage winding, which is situated in rotor slots, in the manner of an asynchronous rotor. The rotor has a laminated core which extends over all three rotor regions and has longitudinally continuous rotor slots and the radius of the laminated core having rotor slots is reduced by at least the radial thickness of the permanent magnet segments in the synchronous rotor region. The step rotor shown is a special design of a rotor which is correspondingly complicated in terms of manufacture and is associated with high costs. In addition, only the appropriate rotor regions are in each case used for the respective mode of operation, that is to say synchronous operation or asynchronous operation, in this rotor design. A design of this kind is therefore not advantageous in respect of the requirement for energy efficiency applicable today.

The rotor from U.S. Pat. No. 4,454,438 has permanent magnets which are arranged around the outer circumference of the rotor core. Either a magnet ring is mounted on the laminated core, or the permanent segments are arranged in pockets. A magnet ring is expensive and complicated to manufacture, and the permanent magnets which are to be pressed into pockets have to be produced with an accurate fit. This rotor also has a special design which requires a large number of complicated working steps in order to be produced.

SUMMARY OF THE INVENTION

It is an object of the present invention to provide a rotor which can be produced with a low level of expenditure and in simple manner and at the same time ensures efficient operation.

This and other objects have been achieved in accordance with the present invention by providing a rotor in which the radius of the rotor over the entire length between the short-circuiting rings is reduced in such a way that the radial height of the cage bars or cage webs which are connected to the cage bars is reduced, and permanent magnets are mounted on the rotor.

The invention makes it possible to modify a commercially available cage rotor by simple turning processing, called turning or turning-in in the text which follows, or generally by material-removing machining, with the result that the magnets can then be fitted within the clearance obtained by the process for reducing the radius. Permanent magnets are mounted on the rotor surface which is obtained by reducing the radius over the entire length between the short-circuiting rings. Since the cage rotor always has to be excessively turned after the die-casting, no additional working process is therefore required; rather, only somewhat more material is removed.

According to the invention, it has been found that a turned starting cage also provides a sufficient effect. A rotor which is obtained by turning a commercially available cage rotor supports both asynchronous starting and synchronous operation by being fitted with permanent magnets. The invention therefore allows for economical production of two different types of motor since it is necessary to make a decision as to whether a normal asynchronous motor with a commercially available cage rotor design or a modified permanent-magnet rotor is to be produced from a turned cage rotor only during a production process. The structural design therefore allows a production line for two motor variants, both for asynchronous cage rotor motors and permanent-magnet line start motors.

One refinement of the invention makes provision for the permanent magnets to be secured by a binding or a, preferably thin, non-magnetic sleeve. It is advantageous here for the short-circuiting rings to be partially turned, so that support surfaces are formed, for example, on both sides of the laminated core.

The support surfaces serve to fix the binding or a support of the non-magnetic rotor sleeve. The partially turned short-circuiting rings serve to fix the start and end of the binding or of the support of a thin non-magnetic rotor sleeve. When a non-magnetic rotor sleeve is used, it has likewise proven advantageous to turn the short-circuiting rings on one side only in an inner region which faces the laminated core, so that a projection is produced, this projection serving as a stop for the rotor sleeve. Turning which takes place on both sides only in the inner subregions of the short-circuiting rings is possible with a rotor binding. As a result, the short-circuiting rings are included in the design of the rotor. Additional fixing means, for example end plates, are not required.

The magnet surfaces which form the poles are advantageously formed by component magnets, preferably rare-earth component magnets, in particular by NdFeB magnets. The use of rare-earth magnets allows for a comparatively low magnet height, this being advantageous for the effect of the turned starting cage. It has proven advantageous for the magnet height to be between 5% and 20%, preferably approximately 10%, of the cage bar height. In the examined power range, a magnet height of approximately 2 mm has proven advantageous. Rare-earth magnets also have a high stability to opposing fields, this leading to said rare-earth magnets not being demagnetized on account of high magnetic fields which produce starting currents.

The component magnets can be arranged so as to be offset or staggered in relation to one another in the axial direction. A staggered arrangement of adjacent component magnets in this way leads to a reduction in the torque ripple during operation of the rotor on account of the contact slot offset which is produced.

According to a further refinement, the rotor coverage with permanent magnets, that is to say the pole coverage, is between 65 and 90%, preferably between 70 and 80%. It has proven advantageous to not completely fit the rotor with magnets in the circumferential direction, but rather to select a pole coverage of between 65 and 90%, preferably between 70 and 80%.

Further refinements of the invention relate to an optimized rotor slot shape. It has proven advantageous here to design the rotor slot shape in such a way that the rotor slot shape results in good motor operation properties both in the turned state and in the unturned state of the cage rotor. It has proven advantageous when the cage bars of the turned rotor retain their original shape. In particular, the cage bars of the turned rotor are formed in the shape of a drop.

Proceeding from a conventional rotor having a squirrel cage, with the rotor having a laminated core which extends over the entire rotor region and has longitudinally continuous rotor slots, with the squirrel cage passing through the rotor slots over the entire length of the laminated core, the squirrel cage being formed with cage bars which are situated, preferably encapsulated, in the rotor slots and short-circuiting rings which connect the cage bars on both end faces of the laminated core, provision is made, according to the invention, for the rotor to have, in particular slot-like, cage webs in a radially outer region, preferably in accordance with at least the radial thickness of permanent magnets which are to be mounted in the case of a synchronous rotor, said cage webs being connected to, in particular drop-shaped, cage bars which are situated in a radially inner region of the rotor. As a result, it is possible for the radius of the asynchronously operated rotor to be reduced over the entire length between the short-circuiting rings by at least the radial thickness of permanent magnets which are to be mounted in the case of a synchronous rotor which is to be manufactured, in such a way that the radial height of the cage webs which are connected to the cage bars is reduced, and the cage bars retain their shape. The unturned rotor has rotor slots for this purpose, said rotor slots forming, in particular slot-like, cage webs in a radially outer region, preferably in accordance with at least the radial thickness of the permanent magnets, and, in particular drop-shaped, cage bars in a radially inner region. In this case, the lower, in particular drop-shaped, design of the cage bar is designed to match the web contour, in particular the slot. Experiments have shown that it is advantageous to design the, in particular drop-shaped, bar contour in the upper region to be somewhat wider and, for this, altogether shorter than usual.

The invention comprises not only the rotor but also includes an electric motor which is equipped with a rotor according to the invention.

A centrifugal pump having an electric motor and also a centrifugal pump arrangement comprising at least one centrifugal pump and at least one electric motor characterized by at least one electric motor and/or rotor according to the invention is likewise covered by the scope of the invention. By way of example, canned motor pumps and underwater motor pumps which are equipped with an electric motor according to the invention can be operated in an energy-efficient manner by the invention.

Due to the self-starting properties of the rotor according to the invention, an electric motor which is equipped with said rotor and/or a centrifugal pump with an electric motor of this kind can be fed by a single-phase or polyphase fixed voltage supply system, that is to say are operated directly from a voltage supply system with a fixed frequency.

A further method makes provision for the electric motor to be fed by a frequency converter, preferably without the position of the rotor being detected. The rotation speed of the electric motor can be controlled in a variable manner by the frequency converter. In this case, the invention makes it possible to allow the electric motor to be fed by a frequency converter of conventional, that is to say not specialized, design. For drive purposes, detection of the rotor position can be dispensed with, this considerably simplifying the design of the frequency converter.

Conventional converters with U/f characteristic curve control can be used. In the case of asynchronous operation, as occurs in the event of a crack in the permanent-magnet rotor, voltages are induced in the cage of the rotor which result in current flow. A force effect is exerted on the rotor together with the magnetic flux lines of the stator, and therefore the rotor again assumes the synchronous rotation speed which can be varied by the U/f converter.

A method according to the invention for producing a rotor or an electric motor according to the invention makes provision, in the case of a cage rotor which is manufactured in a conventional manner, for the radial diameter or radius to be additionally reduced over the entire length of the laminated core beyond the conventional air gap by a material-removing method, in particular a turning-in process, during which process the radius of said cage rotor is reduced over the entire length between the short-circuiting rings in such a way that the radial height of the cage bars of said cage rotor or cage webs which are connected to said cage bars is reduced, and then permanent magnets are mounted on the rotor surface. A commercially available cage rotor is modified by simple turning machining, so that the magnets can then be mounted. A conventionally produced cage rotor does not have to be excessively turned after die-casting in order to acquire an air gap in the state in which it is incorporated in the stator. Therefore, no additional working process is required by the invention; rather, only somewhat more material is removed.

It has proven advantageous to adhesively bond the permanent magnets in the clearance, in particular the groove, which is produced by reducing the radius. In addition to fastening the magnets to the rotor, the adhesive bonding of the magnets serves to electrically isolate the magnets and the laminated rotor core with cage bars on account of the adhesive film which is produced. In the case of small quantities, shell magnets which have already been magnetized can be manually fitted.

A method according to which the permanent magnets, which are preferably mounted on the cage rotor automatically, are magnetized by means of a magnetizing yoke is suitable for larger quantities.

A binding or a, preferably thin, non-magnetic sleeve can be mounted on the permanent magnets in order to secure the permanent magnets. In this case it is advantageous for the short-circuiting rings to likewise be turned and the binding or the non-magnetic sleeve to be fixed or supported by the short-circuiting rings. The turned short-circuiting rings therefore form a support surface or projection surface for fixing the start and/or end of the binding or the sleeve.

BRIEF DESCRIPTION OF THE DRAWINGS

The invention will be described in further detail hereinafter with reference to illustrative preferred embodiments depicted in the accompanying drawing figures, in which.

DETAILED DESCRIPTION OF EMBODIMENTS

Figure 1:
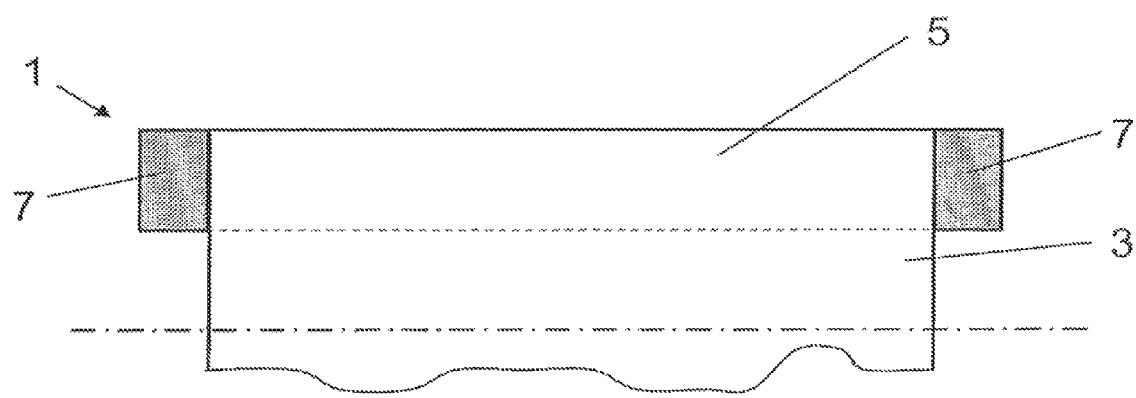
FIG. 1 is a schematic sectional illustration of a cage rotor active part according to the prior art.

FIG. 1 shows a schematic sectional illustration of a cage rotor active part 1 of a cage rotor according to the prior art. For reasons of clarity the rotor shaft is not illustrated. Cage bars 5, which are connected at both ends of the rotor active part 1 by short-circuiting rings 7, are located within a laminated rotor core 3. The cage bars 5 pass through the rotor slots over the entire length of the laminated core 3. In this case, the cage bars 5 which are encapsulated in the rotor slots and the short-circuiting rings 7 which connect the cage bars 5 on both end faces of the laminated core 3 form a squirrel cage. A cage rotor of this kind is usually produced by aluminum or copper pressure die-casting. The required geometric air gap between the stator of an electric motor and the rotor 1 is usually obtained by turning the rotor.

Figure 2:
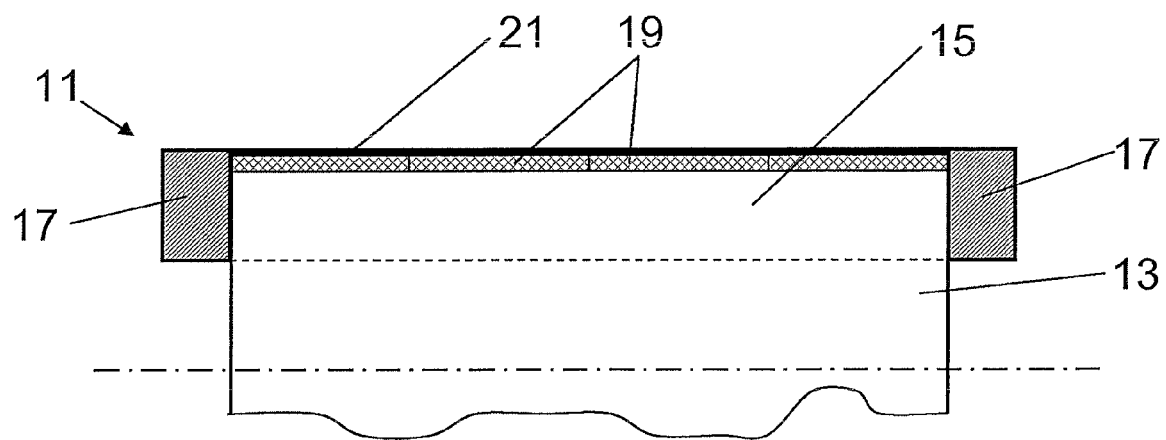
FIG. 2 is a schematic sectional illustration of a rotor according to the invention having additional magnets fitted.

FIG. 2 shows—again in a schematic sectional illustration—a rotor 11 according to the invention which is produced from a cage rotor active part 1 according to the prior art. The rotor 11 has a laminated rotor core 13, cage bars 15 and short-circuiting rings 17. The radius of the laminated rotor core 13 of the rotor 11 according to the invention is reduced over the entire length between the short-circuiting rings 17 by material-removing machining in such a way that the radial height of the cage bars 15 is reduced. Permanent magnet shells 19 are mounted in the laminated rotor core 13, with the permanent magnets in this illustrative embodiment being secured by a rotor binding 21.

The rotor 11 is produced by further processing of a cage rotor 1 according to the prior art by, in addition to material-removing machining, in particular turning or turning-in, additional material-removing machining, in particular turning or turning-in, being performed in order to obtain the required geometric air gap between the stator of an electric motor and the rotor on the rotor core. The shell magnets 19 are then adhesively bonded in the clearance, in particular the groove, which is produced by material-removing machining. The shell magnets 19 may already be magnetized, but subsequent magnetization of the shell magnets by means of a magnetizing yoke is also possible within the scope of the invention.

After the shell magnets 19 are fitted, the rotor obtains a binding 21 for securing the magnets 19. As an alternative, the magnets can be secured by a, preferably thin, non-magnetic sleeve. This sleeve can be pushed, for example, over the magnet shells.

Figure 3:
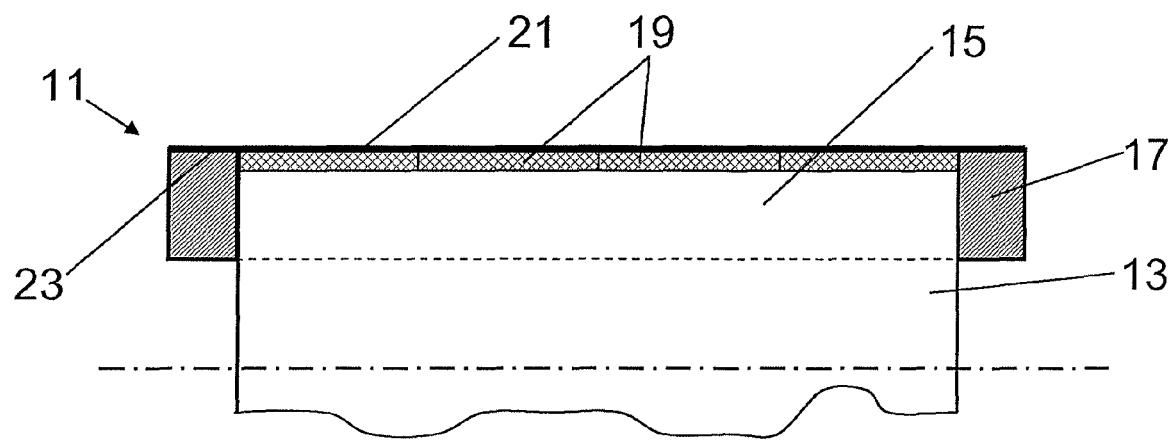
FIG. 3 is a schematic sectional illustration of another rotor according to the invention having short-circuiting rings which form support surfaces.

FIG. 3 shows an alternative embodiment of a cage rotor 11. In this figure, the short-circuiting rings 17 are partly turned, so that support surfaces 23 are formed on both sides of the laminated core 13. The support surfaces 23 serve to fix the binding 21 or to support a non-magnetic rotor sleeve. When a non-magnetic rotor sleeve is used, it has likewise proven advantageous to turn the short-circuiting rings on one side only in an inner region which faces the laminated core, so that a projection is produced, which projection serves as a stop for the rotor sleeve. Turning which takes place on both sides only in the inner subregions of the short-circuiting rings is possible with a rotor binding. As a result, the short-circuiting rings 17 are included in the design of the rotor, and additional fixing means, for example end plates, are not required.

Figure 4:
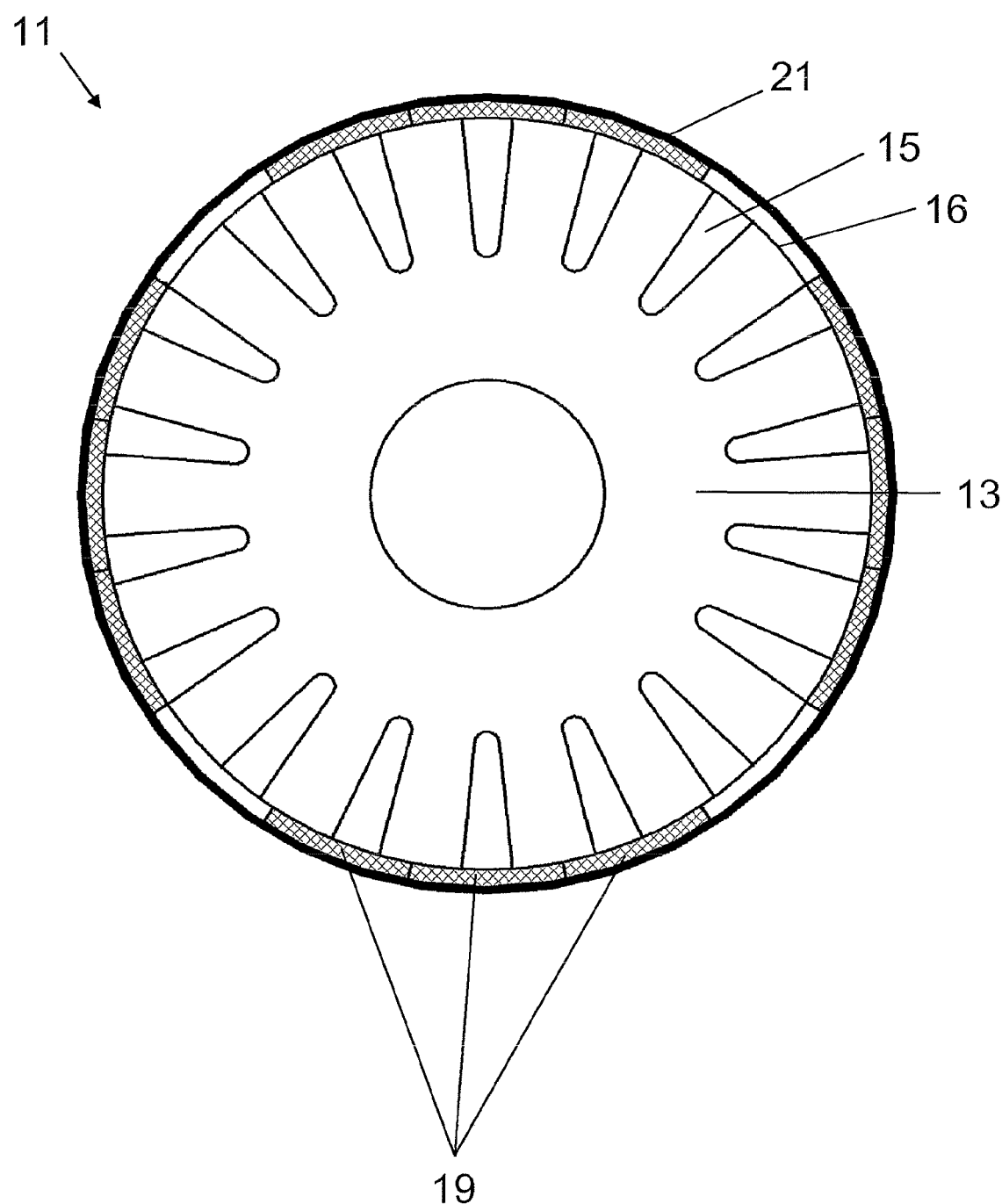
FIG. 4 is another sectional illustration of a rotor having turned-in cage bars.

FIG. 4 shows another sectional illustration of a rotor 11 with turned-in cage bars 15. The turned-in or turned cage bars 15 in the laminated rotor core 13 can be clearly seen in this illustration. Magnet shells 19 are adhesively bonded onto the rotor surface 16, with the adhesive also serving as insulation. In this case, the adhesive film separates the magnets 19 from the rotor surface 16 of the turned rotor 11 in an electrically insulating manner. A binding or a non-magnetic stainless steel sleeve 21 is provided for fixing the magnetic shells 19. According to the invention, the radius of the rotor 11 is reduced over the entire length between the short-circuiting rings 17 of the rotor, so that the radial height of the cage bars 15 is likewise reduced over the entire length between the short-circuiting rings 17, and so that the permanent magnets 19 can be mounted on the laminated core 13. According to the invention, it has been found that a turned starting cage also provides a sufficient effect. A rotor which is produced by turning a commercially available cage rotor supports both asynchronous starting and synchronous operation by being fitted with permanent magnets. The invention therefore allows for economical production of two different types of motor, with it being necessary to make a decision as to whether a normal asynchronous motor with a commercially available cage rotor design or a modified permanent-magnet rotor of synchronous design is to be produced from a turned cage rotor only during a production process.

The rotor 11 is not entirely fitted with magnets 19 in the circumferential direction, but rather has a pole coverage of between 70 and 80%. A plurality of magnet shells 19 form a magnet pole in this case. Magnet surfaces which form the poles are advantageously formed by component magnets which are composed of rare-earth material, in particular of NdFeB magnets. When rare-earth magnets are used, a comparatively low magnet height is required to achieve a sufficient effect. Furthermore, magnets of this kind have a high stability to opposing fields, this leading to the magnets not being demagnetized as a result of high magnetic fields which produce starting currents either.

Figure 5A:
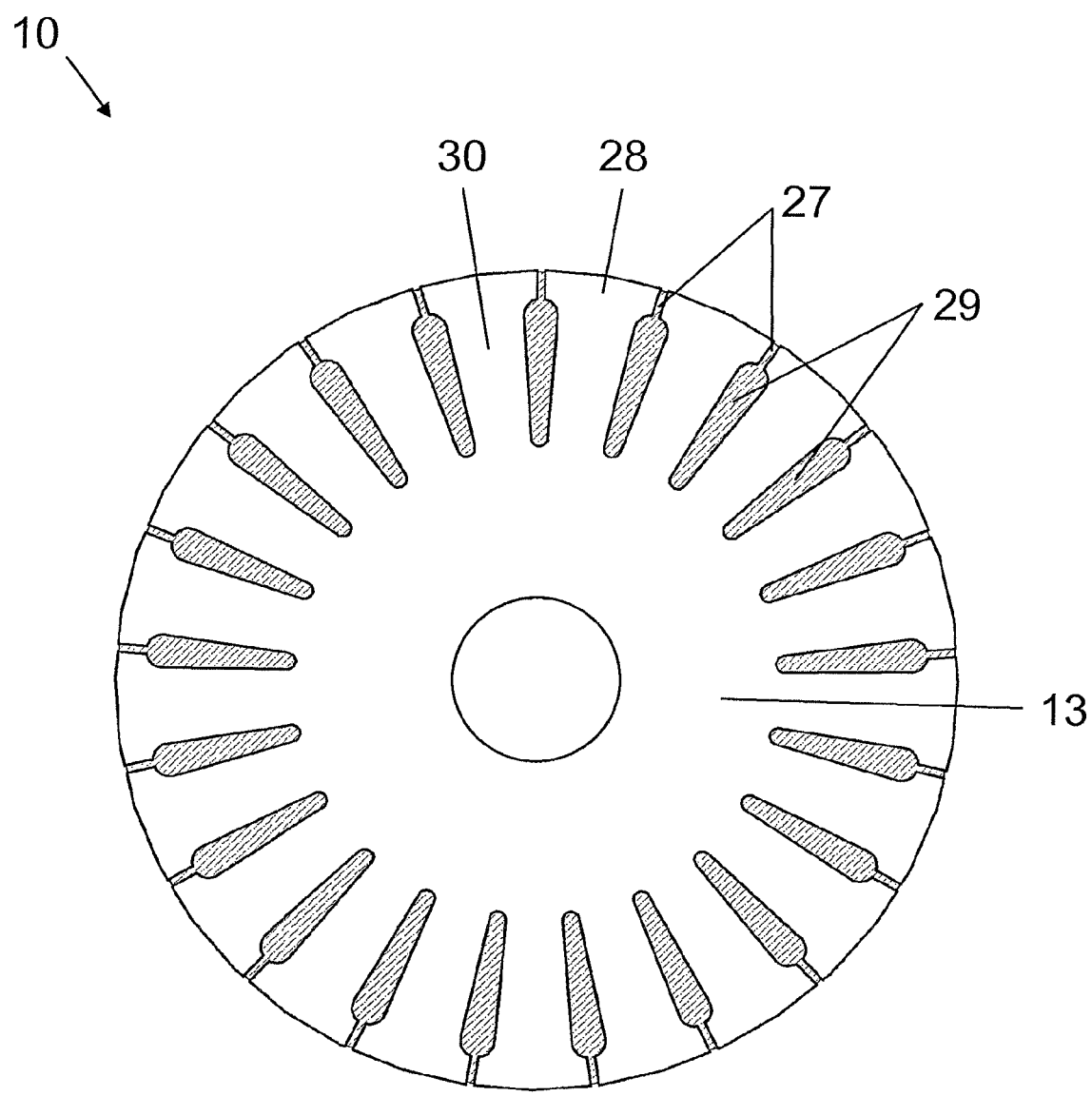
FIGS. 5a and 5b, respectively, are sectional illustrations of a rotor which is not turned-in and has an optimized rotor slot shape and of a turned-in rotor which is produced from said rotor.

FIG. 5a shows a sectional illustration of an unturned rotor 10 having an optimized rotor slot shape. The rotor slot shape used in this illustrative embodiment is characterized by an enlarged web region 27 and deep cage bars 29. The rotor 10 therefore has pronounced or enlarged cage webs 27. A rotor slot shape of this kind ensures good motor operating properties both in the unturned state and in the turned state of the rotor 11. The unturned rotor 10 specifically has rotor slots which are in the form of slot-like webs in a radially outer region 28, preferably in accordance with at least the radial thickness of the permanent magnets, and which are in the form of drop-shaped bars in a radially inner region 30. In this form, the rotor 10 is suitable as a rotor for a cage rotor of an asynchronous machine.

Figure 5B:
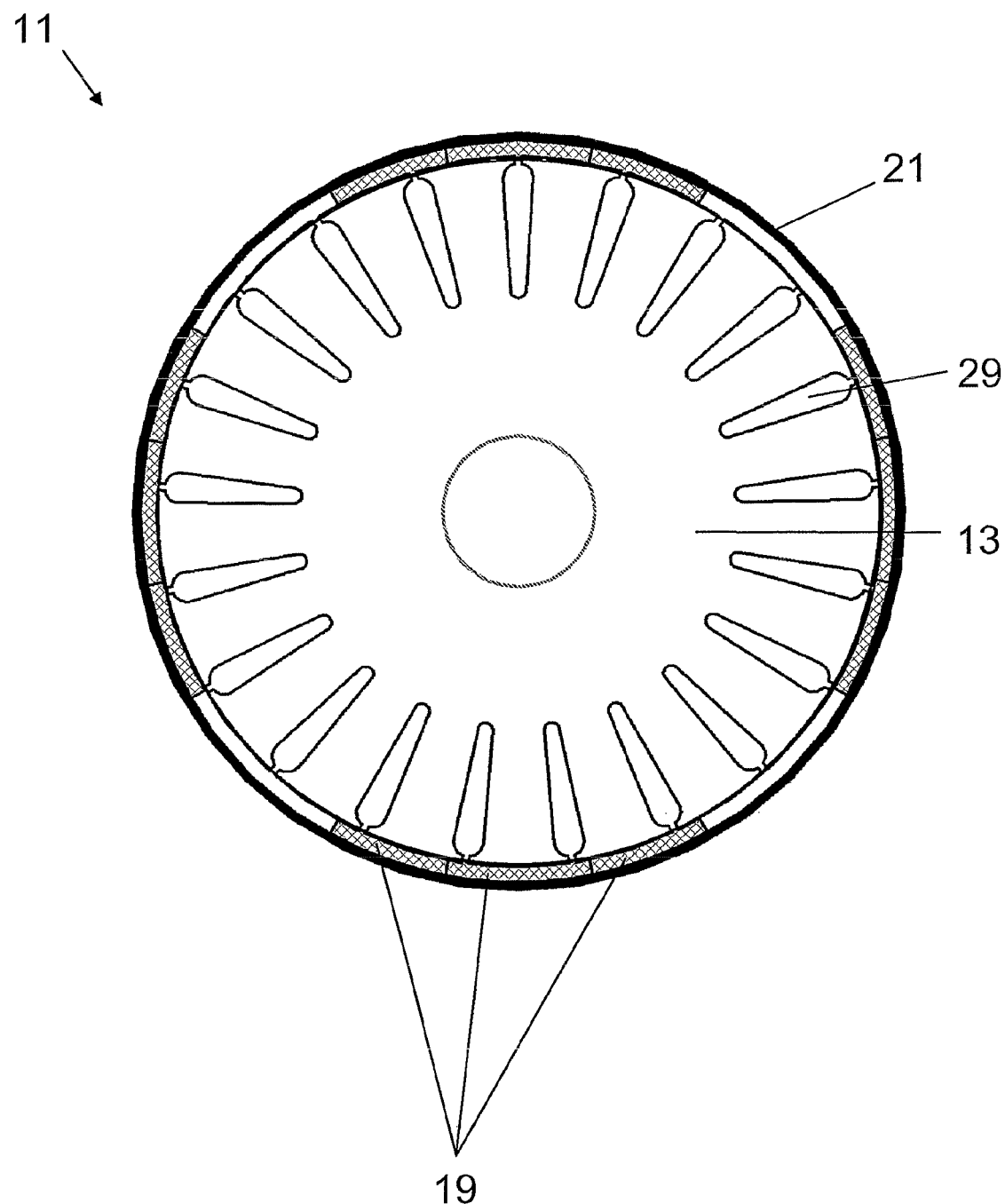

FIG. 5b shows a rotor 11 of synchronous design which is produced from a rotor 10 according to FIG. 5a. The drop-shaped bars 29 which are situated relatively deep in the laminated rotor core 13 completely retain their shape even after turning. This results in good motor operating properties. The turning depth between the radius of the asynchronous rotor 10 and the radius of the synchronous rotor 11 differ only in respect of the height of the magnets 19, the thickness of a binding 21 which is conventionally provided, and the difference in the air gap widths between the two motors. It can be seen that, in the optimized rotor slot shape shown according to FIG. 5a, the cage bars retain the drop shape in the turned rotor according to FIG. 5b, thereby producing good motor operating properties. The invention provides a building block concept by means of which, only when a rotor is produced, a decision has to be made as to whether a conventional motor with asynchronous technology or a motor with synchronous technology is intended to be produced.

Figure 6:
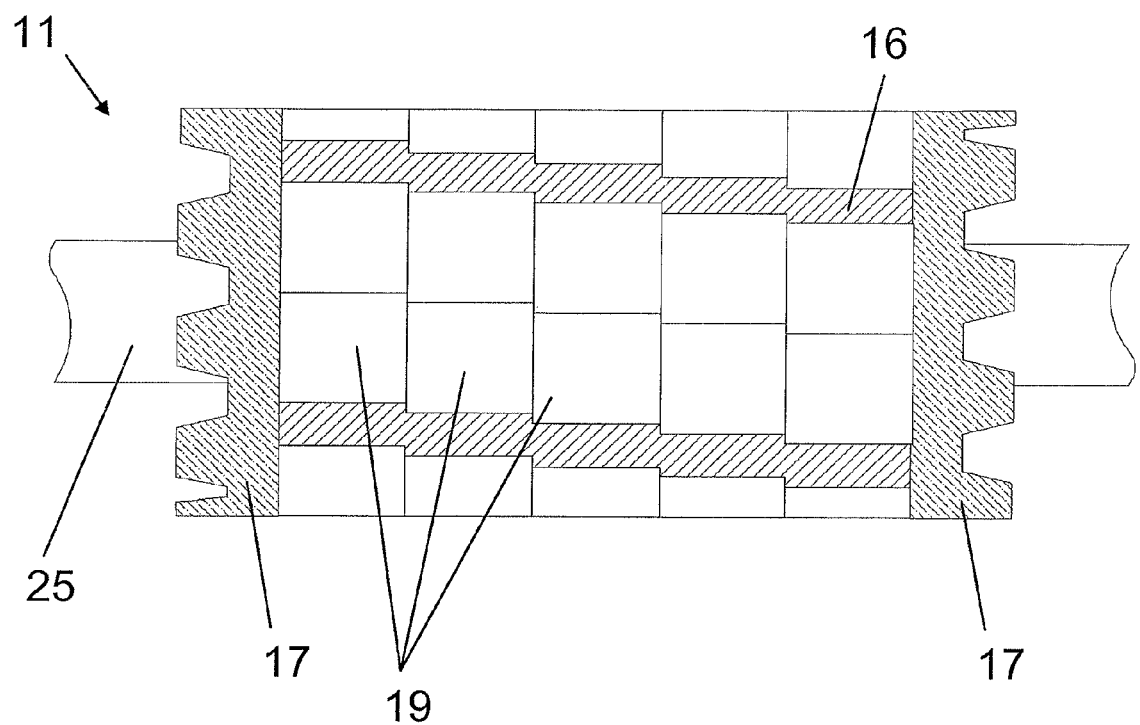
FIG. 6 is a plan view of a rotor with magnets arranged so as to be offset in the axial direction.

FIG. 6 shows a plan view of a rotor 11 which is arranged on a shaft 25. This figure shows the short-circuiting rings 17 on both end faces of the laminated core and the magnets 19 which are mounted on the turned rotor 11 and the rotor surface 16 of said rotor. The magnets 19 are distributed uniformly or symmetrically on the rotor surface 16 in the circumferential direction. A magnet pole is formed from a plurality of component magnets. The component magnets are arranged so as to be offset or staggered in relation to one another in the axial direction. This staggered arrangement of adjacent component magnets leads to a reduction in the torque ripple during operation of the rotor 11 due to the contact slot offset which is produced.

Figure 7:
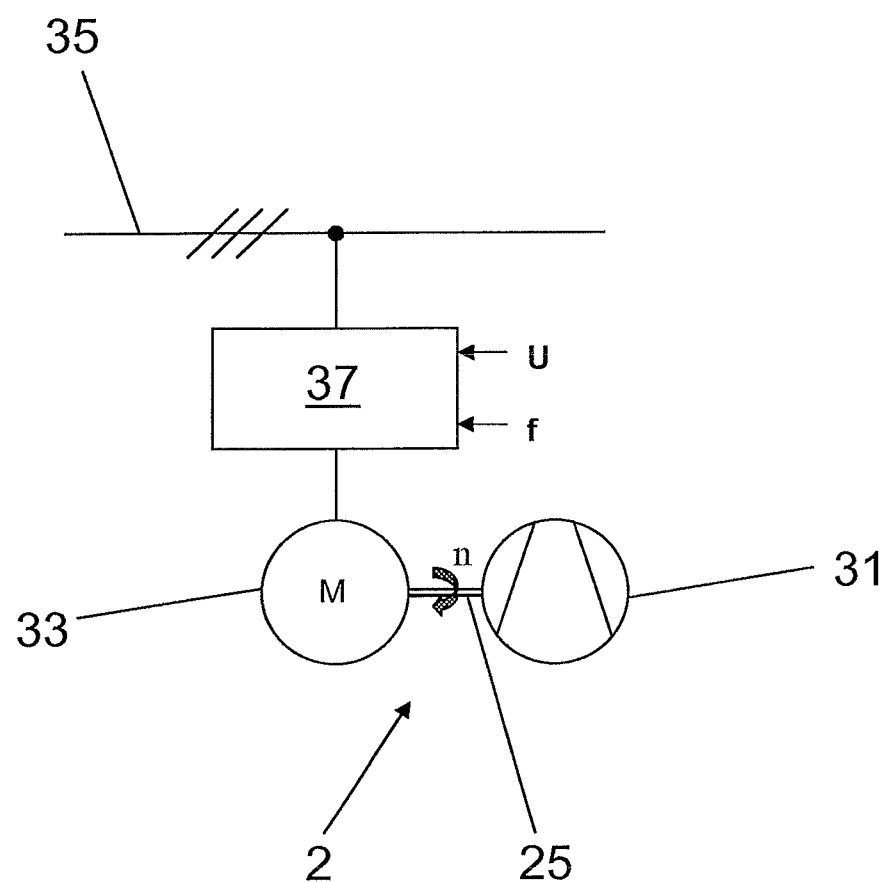
FIG. 7 is a basic illustration of a drive concept of a centrifugal pump arrangement having an electric motor which is equipped with a rotor according to the invention.

FIG. 7 shows a centrifugal pump arrangement 2 having an electric motor 33 which is equipped with a rotor 11 according to the invention, and a basic illustration of a drive concept of the centrifugal pump arrangement 2. A centrifugal pump 31 is driven by an electric motor 33, which is equipped with a rotor according to the invention, via a shaft 25. Because of the self-starting properties of the rotor according to the invention, an electric motor 33 which is equipped with the rotor and/or the centrifugal pump 31 can be fed by a single-phase or polyphase fixed voltage supply system 35, that is to say it can be operated directly from the voltage supply system 35 with a fixed frequency.

In this illustrative embodiment, the rotation speed n of the electric motor 33 is controlled in a variable manner by a frequency converter 37. In this case, the electric motor 33 is fed by a frequency converter 37 of conventional, that is to say not specialized, design. In order to drive the electric motor which is equipped with a rotor according to the invention, detection of the rotor position can specifically be dispensed with, as a result of which a conventional converter 37 with U/f characteristic curve control can be used. This drive concept is suitable for centrifugal pumps with a variable rotation speed and allows operation at the converter without the position of the rotor being detected. Emergency operation at the fixed three-phase power supply system is also possible. Therefore, simple U/f converters can be used, as are usually used in pump drives with asynchronous technology. A transmitter system for detecting the position of the rotor is not required and therefore the signal line between the motor and converter and the evaluation electronics in the converter which are otherwise additionally required are also dispensed with. A high level of energy efficiency is achieved in the case of stationary synchronous operation due to the permanent-magnet excitation.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A rotor having a squirrel cage and permanent magnets distributed around the circumference, said rotor having a laminated core which extends over an entire rotor region of the rotor and is provided with longitudinally continuous rotor slots, wherein
   the squirrel cage passes through the rotor slots over the entire length of the laminated core,
   the rotor slots each include a cage web portion in a radially outer region of the rotor and a cage bar portion in a radially inner region of the rotor, the cage web portion having a width in a circumferential direction of the rotor smaller than the cage bar portion,
   the squirrel cage is formed with cage bars which are disposed in the rotor slots and with short-circuiting rings which connect the cage bars on both end faces of the laminated core in short-circuiting regions of the rotor,
   a radius of the entire rotor region is smaller over its entire outer circumference than a radius of the short-circuiting rings by at least a radial thickness of the permanent magnets, and
   the permanent magnets are mounted on the rotor.

2. The rotor as claimed in claim 1, wherein the permanent magnets are secured by a binding or by a non-magnetic sleeve.

3. The rotor as claimed in claim 2, wherein the short-circuiting rings are partially turned to a radius corresponding to an outer radius of the permanent magnets when the permanent magnets are located on the rotor.

4. The rotor as claimed in claim 1, wherein magnet surfaces which form poles are formed by component magnets.

5. The rotor as claimed in claim 4, wherein the component magnets are rare-earth component magnets.

6. The rotor as claimed in claim 4, wherein the component magnets are arranged offset or staggered in relation to one another in the axial direction.

7. The rotor as claimed in claim 1, wherein said rotor has a pole coverage with permanent magnets of between 70 and 80%.

8. The rotor as claimed in claim 1, wherein the cage bars of the rotor in the radially inner region of the rotor are formed in the shape of a drop.

9. An electric motor comprising a rotor as claimed in claim 1.

10. A centrifugal pump arrangement comprising;
    a centrifugal pump; and
    an electric motor operatively connected to said pump to drive said pump,
    wherein the electric motor includes a rotor as claimed in claim 1.

11. The centrifugal pump arrangement as claimed in claim 10, wherein said electric motor is supplied with electricity by a voltage supply system with a fixed frequency.

12. The centrifugal pump arrangement as claimed in claim 10, wherein said electric motor is supplied with electricity by a frequency converter without detecting the position of the rotor.

13. The rotor as claimed in claim 1, wherein
the cage web portion of each of the rotor slots is slot-shaped in the radially outer region of the rotor, the cage bar portion of each of the rotor slots is drop-shaped in the radially inner region of the rotor and is connected to the web cage portion in the radially-outer region of the rotor, and an inner radius of the permanent magnets when mounted on the rotor is greater than an outer radius of the drop-shaped cage bar portion of each rotor slot.

14. An electric motor comprising a rotor as claimed in claim 13.

15. A centrifugal pump arrangement comprising;
a centrifugal pump; and
an electric motor operatively connected to said pump to drive said pump,
wherein the electric motor includes a rotor as claimed in claim 13.

16. The centrifugal pump arrangement as claimed in claim 15, wherein said electric motor is supplied with electricity by a voltage supply system with a fixed frequency.

17. The centrifugal pump arrangement as claimed in claim 15, wherein said electric motor is supplied with electricity by a frequency converter without detecting the position of the rotor.

\* \* \* \* \*